United States Patent
Kulekci et al.

(10) Patent No.: US 10,740,554 B2
(45) Date of Patent: Aug. 11, 2020

(54) METHOD FOR DETECTING DOCUMENT SIMILARITY

(71) Applicant: ISTANBUL TEKNIK UNIVERSITESI, Istanbul (TR)

(72) Inventors: Muhammed Oguzhan Kulekci, Istanbul (TR); Mustafa Ersel Kamasak, Istanbul (TR)

(73) Assignee: ISTANBUL TEKNIK UNIVERSITESI, Istanbul (TR)

(*) Notice: Subject to any disclaimer, the term of this patent is extended or adjusted under 35 U.S.C. 154(b) by 36 days.

(21) Appl. No.: 16/082,272

(22) PCT Filed: Jan. 23, 2017

(86) PCT No.: PCT/TR2017/050037
§ 371 (c)(1),
(2) Date: Sep. 5, 2018

(87) PCT Pub. No.: WO2018/136020
PCT Pub. Date: Jul. 26, 2018

(65) Prior Publication Data
US 2019/0087390 A1  Mar. 21, 2019

(51) Int. Cl.
*G06F 40/194* (2020.01)
*G06K 9/00* (2006.01)
(Continued)

(52) U.S. Cl.
CPC ........ *G06F 40/194* (2020.01); *G06F 21/6245* (2013.01); *G06F 40/12* (2020.01);
(Continued)

(58) Field of Classification Search
CPC ...... G06F 17/28; G06F 17/2785; G06F 17/21; G06F 17/27; G06F 17/2211
See application file for complete search history.

(56) References Cited

U.S. PATENT DOCUMENTS 8,209,339 B1 *  6/2012  Tong ............... G06F 16/319
                                        707/749
9,143,393 B1 *  9/2015  Bird ................ H04L 41/046
(Continued)

FOREIGN PATENT DOCUMENTS

CN         1447603 A     10/2003

OTHER PUBLICATIONS

Urvashi Garg and Vishal Goyal, Maulik: A Plagiarism Detection Tool for Hindi Documents, Indian Journal of Science and Technology, vol. 9, Mar. 2016, pp. 1-11. (Year: 2016).*
(Continued)

*Primary Examiner* — Ariel Mercado
(74) *Attorney, Agent, or Firm* — Bayramoglu Law Offices LLC

(57) ABSTRACT

This invention is related to a document similarity detection method in which non-prefix-free (NPF) coding of the input documents as a transform is used to provide the privacy. The method includes the following steps, encoding the symbols of the documents with non-prefix-free coding scheme, obtaining the transformed documents, calculating the similarity score of the transformed documents with the normalized compression distance similarity metric.

1 Claim, 2 Drawing Sheets

---

Encoding a plurality of symbols for a plurality of documents with a non-prefix-free coding scheme Obtaining a plurality of transformed documents Calculating a similarity score of the plurality of transformed documents by a normalized compression distance similarity metric

(51) Int. Cl.
*G06K 9/62* (2006.01)
*G06F 40/12* (2020.01)
*G06F 21/62* (2013.01)
*H03M 7/30* (2006.01)
*H03M 7/14* (2006.01)
*H03M 7/40* (2006.01)

(52) U.S. Cl.
CPC ....... *G06K 9/00483* (2013.01); *G06K 9/6215* (2013.01); *H03M 7/14* (2013.01); *H03M 7/30* (2013.01); *H03M 7/4037* (2013.01)

(56) References Cited

U.S. PATENT DOCUMENTS

| | | | |
|---|---|---|---|
| 9,760,548 B2* | 9/2017 | Cooke | G06F 40/126 |
| 2012/0254333 A1* | 10/2012 | Chandramouli | G06F 17/27 |
| | | | 709/206 |
| 2012/0296637 A1* | 11/2012 | Smiley | G06F 17/2785 |
| | | | 704/9 |
| 2014/0281856 A1* | 9/2014 | Byrne | G06F 17/2235 |
| | | | 715/205 |
| 2015/0033120 A1* | 1/2015 | Cooke | G06F 17/2217 |
| | | | 715/271 |
| 2015/0302886 A1* | 10/2015 | Brock | G06F 21/10 |
| | | | 726/32 |
| 2016/0055196 A1* | 2/2016 | Collins | G06F 17/2211 |
| | | | 707/690 |

OTHER PUBLICATIONS

John S. Whissell and Charles L.A. Clarke, Effective MEasures for Inter-Document Similarity, CIKM'13, Oct. 27, 2013, pp. 1-10 (Year: 2013).*

J. Whissell and C. Clarke, "Effective Measures for Inter-Document Similarity", CIKM' 13, Oct. 27-Nov. 1, 2013, 1361-1370. (Year: 2013).*

Marco Dalai et al., Non prefix-free codes for constrained sequences, Department of Electronics for Automation University of Brescia, Italy, Jun. 10, 2015.

Kulekci M Oguzhan, Uniquely Decodable and Directly Accessible Non-Prefix-Free Codes via Wavelet Trees, 2013 IEEE international symposium on information theory, IEEE, Jul. 7, 2013, pp. 1969-1973.

* cited by examiner a. $(\alpha', \alpha)$ plot b. $\alpha' - \alpha$ plot

METHOD FOR DETECTING DOCUMENT SIMILARITY

CROSS REFERENCE TO RELATED APPLICATIONS

This application is the national phase entry of International Application No. PCT/TR2017/050037, filed on Jan. 23, 2017 the entire contents of which are incorporated herein by reference.

TECHNICAL FIELD

This invention is related to a method of privacy preserving document similarity detection.

This invention is particularly related to a document similarity detection method in which non-prefix-free (NPF) coding of the input documents as a transform is used to provide the privacy.

BACKGROUND

Similarity computation between documents has many applications such as plagiarism detection, copyright management, duplicate report detection, document classification/clustering, and search engines, just to list a few. Many solutions have appeared assuming that the contents of the documents are public, where the general tendency here is to first compute a feature vector that is mainly based on the number of occurrences of words in the document, or n-gram frequencies. Those features, or the fingerprint values extracted from them, are then compared to compute the similarity score. Despite natural language processing based approaches, the information distance based similarity metric has also been applied for some practical cases such as software plagiarism detection.

The necessity for the privacy preserving similarity detection appears when the owners of the documents want to keep their contents secret, while at the same time they need to measure the similarity in between. Some example scenarios include, but not limited to, duplicate submission control between the related conferences and journals in academia, and information sharing between the insurance companies or intelligence agencies.

In simultaneous submission detection problem, since the content of each individual submission is private, the submitted venues cannot share the submissions publicly to check whether there exist multiple very similar copies of the same paper under review at other venues at the same time. However, in case a practical privacy preserving document similarity tool is available, then the related venues such as the conferences or journals accepting papers at the same time on similar topics, may use of this procedure to control the duplicate submissions.

Another example is on the document comparison between the insurance companies to detect fraud applications. When a damage or a loss is claimed from one company, it might be required to check similar claims filed from others. However, since those claims are confidential, public comparison is not possible, where the companies need a privacy preserving similarity method to compare the files without breaking their privacy. Similar scenarios can be imagined for the information sharing during a collaboration between the governmental intelligence agencies.

The known methods proposed to solve the privacy preserving document similarity detection problem generally begin with encrypting the extracted features from the documents mostly with a homomorphic scheme, which makes some limited operations possible to be computed on the encrypted data, while keeping the information provably secure. Based on those operations doable via homomorphic encryption, the comparison of the encrypted feature vectors are achieved via some multi-party secure computation protocols. However, the inherent practical difficulties of the homomorphic schemes inhibit the usage of the previous solutions for the privacy preserving document similarity detection.

The Chinese patent document numbered CN1447603 of the known state of the art relates to the technique of data lossless compression and decompression in information technique area the loss less compression and decompression using information source entropy coding are all based on the entropy coding method of non-prefix code, which builds a binary tree based on frequency of occurrence of the message source as well as builds the codes of message source through the search from root to leafs. This method does not aim to provide a method for privacy preserving document similarity detection and the non-prefix coding is totally different.

In the paper titled "Non prefix-free codes for constrained sequences" (Dalai, Marco & Leonardi, Ricardo, Department of Electronics for Automation University of Brescia, Italy), using of variable length non prefix-free codes for coding constrained sequences of symbols is mentioned. This method does not aim to provide a method for privacy preserving document similarity detection and the non-prefix coding is totally different.

SUMMARY

The aim of this invention is to provide a method in which non-prefix-free (NPF) coding of the input documents as a transform is used to provide the privacy.

Another aim of this invention is to provide a method in which variable-length codes in the non-prefix-free codes are used for security purposes.

In this method, a novel privacy preserving document similarity detection is presented. The privacy in the method is based on the lack of unique decodability in non-prefix-free codes, which is different from the solutions offered to date that rely on mostly the homomorphic schemes and multi-party secure computation methods. While preserving the privacy, the NPF coding does not alter the patterns in the source files since it simply replaces symbols of the files with variable bit-length codewords. Thus, the regularities in between the documents are kept in their transformed versions also. Thanks to this property, the normalized compression distance (NCD) as a very suitable tool is used for the similarity detection. The NCD similarity of two sequences is a value between 0 and 1. The experiments conducted on 100-files corpus revealed that the deviation between the NPF transformed and normal plain comparisons is around 0.02 points, which is quite acceptable in practical usage. Despite the NCD similarity metric, it might be possible to integrate the same idea of NPF coding transform to the other proposed similarity evaluations such as the ones based on n-gram symbol counts.

DETAILED DESCRIPTION OF THE EMBODIMENTS

Figure 1:
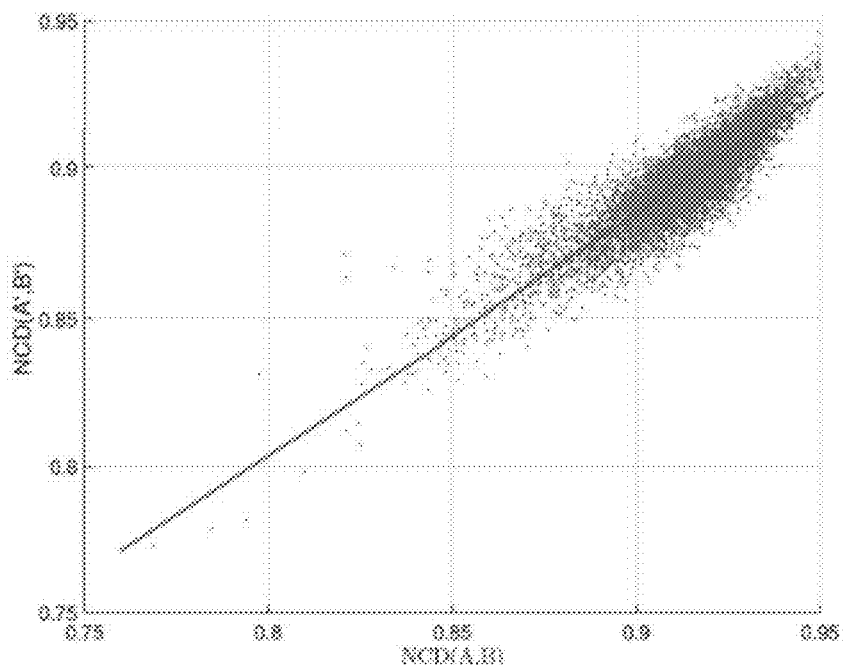
FIG. 1 is a graph showing the correlation between the similarity scores obtained between the NPF-encoded and plain documents.

Let $A = a_1 a_2 \ldots a_p$ and $B = b_1 b_2 \ldots b_q$ represent two documents of respectively p and q symbols long, where each character $a_i$ and $b_j$ is drawn from the alphabet $\Sigma = \{\varepsilon_1, \varepsilon_2 \ldots \varepsilon_6\}$ for valid $1 \leq i \leq p$ and $1 \leq j \leq q$. The similarity score computed with the method S( ) is denoted by S(A,B).

The normalized compression distance similarity metric used in this method is based on the fact that if two documents are similar then each of them should be able to be compressed well with the model extracted from the other. In other words, when one of them is concatenated to the end of the other document, and send to a compressor, the compression ratio obtained should be reflecting their similarity since combined similar documents would result better compression then
the unrelated pairs. Normalizing the compression ratio by respecting possible different lengths of the documents, the NCD similarity score is represented by the formula $$NCD(A, B) = \frac{C(AB) - \min(C(A), C(B))}{\max(C(A), C(B))}$$

Here, C( ) is an arbitrary compressor, and AB is the concatenation of the documents A and B. The score is between 0 and 1. The similarity increases towards 0 and decreases towards 1.

In this method the documents are encoded with a non-prex-free coding scheme. Assume $W = \{w_1, w_2 \ldots w_6\}$ is a codeword set generated for the alphabet $\Sigma = \{\varepsilon_1, \varepsilon_2 \ldots \varepsilon_6\}$. Each $w_i$ is a bit sequence of arbitrary length, which may be a prefix of another codeword $w_j$ from W. Given a sequence $T = t_1 t_2 \ldots t_n$ for $t_i \in \Sigma$, the NPF: $\Sigma \rightarrow W$ coding replaces all occurrences of $\varepsilon_i$ with its corresponding $w_i$ on T.
T=NONPREFIXFREE
$\Sigma = \{E, R, F, N, I, O, P, X\}$
W={01, 0, 111, 001, 010, 1111, 00, 1}
NPF(T)=0011111001000111010111100101

Example. 1: An Example Non-Prefix-Free Coding of the Sequence T=NONPREFIXFREE

Example 1 demonstrates a sample NPF coding on a given T=NONPREFIXFREE.

The codewords in W are not prefix free. For example, the codeword 1 assigned to symbol X is a prefix of the codewords 111, 1111 assigned to F and O respectively. Other instances of that non-prefix-free property appear on W. The encoded bit stream for the sample T is shown. Notice that the codeword boundaries cannot be determined on the encoded stream due to the non-prefix-free property. The same stream can have many other parses according to the codeword set W, e.g., the initial bits 0011111 can also represent the sequence PFXX, and so on. Due to the lack of unique decodability, the non-prefix-free codes are not much interesting in terms of data compression.

Variable-length codes can also be used for security purposes. It had been previously shown that the prefix-free codes such as the Huffman codes are difficult to cryptanalyze, and it is hard to extract the original sequence from the prefix-free encoded version. The situation worsens in case of non-prefix-free codes since there are a lot less restrictions to be used in a ciphertext-only attack.

Despite the difficulty for extracting the original sequence, the NPF coding scheme actually preserves the syntactic structures of the documents. The portions that are equal to each other in distinct documents are mapped to the same bit stream. Thus, the shared information content is preserved after the NPF transform. For that reason the NCD distance between the documents are preserved in their NPF transformed versions. More formally, $|S(A,B) - S(NPF(A), NPF(B))|$ is expected to be small.

The Method

Assume Alice and Bob own the document A and the document B respectively. We assume both documents have the same alphabet $\Sigma$. They would like to know how similar the documents are without revealing the contents to each other. To achieve this goal, they encode their documents with the same NPF codeword set W, that they had previously agreed on.

The codeword set W for the NPF coding can be chosen arbitrarily since the aim
here is not efficiency in data representation, but private data comparison. The important thing is to let codewords to be prefixes of others. With this in mind, the codeword set W for a given alphabet $\Sigma$ can be prepared as follows.

The sequence $X = <1, 2 \ldots \sigma>$ is shuffled by the help of a pseudo-random number generator PRNG to get a random permutation of numbers from 1 to $\sigma$. The PRNG is first initialized with an arbitrarily chosen seed. For each i=1 to $\sigma$ in order, the values at $x_i$ and $x_r$ are exchanged, where r is the random number generated by the PRNG in between 1 and $\sigma$. The procedure is repeated K times for a large K, e.g., 1000 times in the experiments conducted. At the end a random permutation $X' = <x_1, x_2, \ldots, x_\sigma>$, for $x_i \in \{1, 2, 3 \ldots \sigma\}$ and $x_i \neq x_j$ unless i=j, is prepared.

The codewords in W are generated by setting each $w_i$ to the minimal binary representation of $(x_i+1)$. The minimal binary representation bit sequence for an integer i is the binary string of length $\lfloor \log_2 i \rfloor$ without the leftmost bit set to 1, e.g., the minimal binary representation of $5 = (101)_2$ is 01 that is of length $2 = \lfloor \log_2 5 \rfloor$ For example, assuming an alphabet size $\sigma = 8$, and the random permutation vector as $X = <2, 5, 3, 6, 7, 1, 4, 8>$, the codewords set W is generated as W={1, 10, 00, 11, 000, 0, 01, 001} by the described procedure.

Notice that by using the same seed for the PRNG initialization and repeating the shuffling operation for the same K times, both parties will have the same permutation, and thus, the same W.

Once Alice and Bob encoded their documents with the same non-prefix-free codeword set W, they are ready to compute the similarity score of the transformed
documents. Since extracting the original documents from their NPF encoded transforms is hard due to the lack of codeword boundaries on the transformed bit sequences, they can exchange the documents and compute the similarity with the NCD metric described above. If the similarity score is below a certain threshold, then this implies the original documents are related since the similarity between the transformed documents reflect the similarity of the originals.

However, in this scenario, Alice and Bob may not want to exchange their documents even they are NPF encoded. That is because, although practically the privacy of the documents can be assumed to be established, the parties may be skeptical about the provable security of the system. Such a case may be expected when Alice and Bob are agents of intelligence services, who would like to check whether both sides have similar knowledge on an issue. On the other hand, it is not very likely if Alice and Bob are the program committee chairs of related conferences, who would like to examine whether there exist simultaneous submissions.

Anyway, if there exist a concern of that type, both parties grant a third trusted party to access the NPF encoded documents, and that third party performs the NCD computation. Notice that since that trusted third party has zero knowledge about the NPF codeword set, and the documents, it is much harder for him or her to try a ciphertext only attack.

Experimental Results

We have collected a corpus of 100 documents that are the daily columns of 5 distinct Turkish journalists. Each author is represented by 20 files, which makes a total of 100 documents. Each document is around 5 KB long in size.

Our main curiosity in the experiments is to observe how much does the similarity in the private domain shown by $\alpha' \leftarrow NCD(NPF(A),NPF(B))$ will be close to similarity in the public domain as shown by $\alpha \leftarrow NCD(A,B)$.

With that purpose we have computed the similarity scores between each possible pair of documents. Afterwards, we have encoded each document with the proposed NPF coding scheme by selecting a random seed, and using the PRNG of the C programming language (rand( ) command) to produce the random numbers required. We assumed the 256-symbol ASCII codes as the source alphabet of the documents. The NPF encoded document corpus was created in this way.

There is a small nuance here in terms of practical usage. While saving the encoded documents we have represented each bit with a byte. The reason for that depends on the working mechanisms of the daily compressors, which are byte oriented. The compressors that are also used in the NCD software, assumes an input sequence as a byte stream instead of a bit stream. Thus, we preferred to spend one byte per bit in the NPF encoded sequences not to loose any precision in the compression phase of the similarity calculation with the NCD.

FIG. 1 represents the linear correlation between the similarity scores obtained between the NPF encoded and plain documents. The similarity scores are between 0 (high similarity) and 1 (low similarity). The graph simply marks ($\alpha'$, $\alpha$) tuples, where $\alpha' \leftarrow NCD(NPF(A),NPF(B))$ and $\alpha \leftarrow NCD(A,B)$ which is of number $$\binom{100}{2} = 4950.$$

Figure 2:
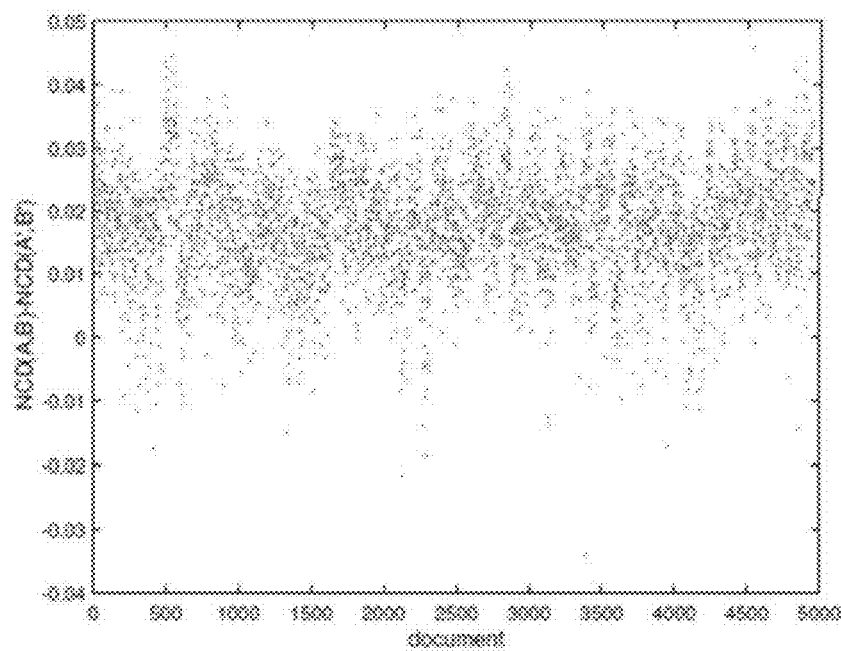
FIG. 2 is a graph showing the difference between a and a' obtained in an experimental result using the inventive method.

The FIG. 2, shows the difference between $\alpha$ and $\alpha'$. It is observed that this difference is around 0.02 on the average, with some worst cases appearing around 0.04.

Figure 3:
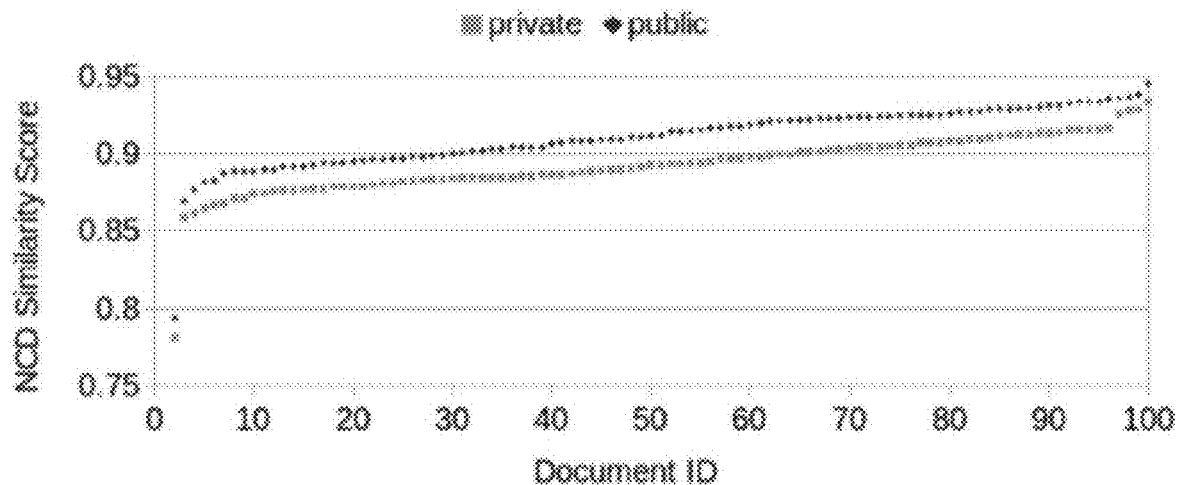
FIG. 3 is another graph showing the comparison of similarity scores obtained between a sample document and the rest of the corpus 3 in plain (public) format and NPF-encoded (private) format.
Figure 4:
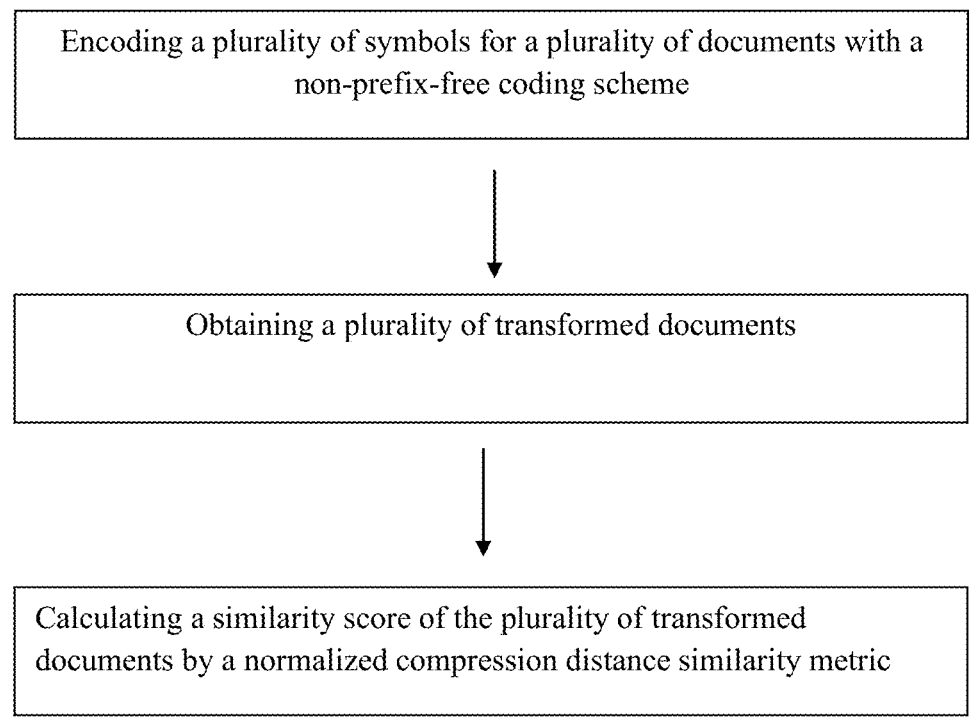
FIG. 4 is a schematic flow diagram illustrating an embodiment of the method of the invention.

FIG. 3 depicts the comparison of similarity scores obtained between a sample document and the rest of the corpus 3 in plain (public) format and NPF encoded (private) format. It is observed that the similarity scores between the NPF encoded documents are around 0.02 points better than the plain formats. This is because, besides the preserved real syntactic similarities, the NPF coding might also introduce some pseudo similarities also stemming from the variable length codes. For instance, a bit sequence that appears on both encoded documents does not imply that the documents on that section share a common phrase. However, the reverse is true that if the documents share a phrase, their NPF encoded transforms will also generate the same bit sequence there. Because of that reason the NPF encoded documents usually report a slightly better similarity score, which is the main source of that 0.02 points deviation in between a and a'.

We have presented a novel privacy preserving document similarity detection method. The privacy in the proposed method is based on the lack of unique decodability in non-prefix-free codes, which is different from the solutions offered to date that rely on mostly the homomorphic schemes and multi-party secure computation methods. While preserving the privacy, the NPF coding does not alter the patterns in the source files since it simply replaces symbols of the files with variable bit-length codewords. Thus, the regularities in between the documents are kept in their transformed versions also. This property led us to use the normalized compression distance (NCD) as a very suitable tool to be used for the similarity detection. The NCD similarity of two sequences is a value between 0 and 1. The experiments conducted on 100-files corpus revealed that the deviation between the NPF transformed and normal plain comparisons is around 0.02 points, which is quite acceptable in practical usage. Despite the NCD similarity metric, it might be possible to integrate the same idea of NPF coding transform to the other proposed similarity evaluations such as the ones based on n-gram symbol counts.

What is claimed is:

1. A method for detecting document similarity, comprising the following steps:
    encoding a plurality of symbols for a plurality of documents with a non-prefix-free coding scheme,
    obtaining a plurality of transformed documents, wherein a non-prefix-free (NPF) coding of a plurality of input documents as a transform is used to provide privacy, wherein the plurality of transformed documents are the plurality of documents being encoded with the non-prefix-free coding scheme,
    calculating a similarity score of the plurality of transformed documents by a normalized compression distance similarity metric; wherein the plurality of symbols of the plurality of documents are replaced with a plurality of variable bit-length codewords, and a first variable bit-length codeword of the plurality of variable bit-length codewords is a prefix of a second variable bit-length codeword of the plurality of variable bit-length codewords, wherein the similarity score is below a certain threshold, then the similarity score implies a plurality of original documents are related since a similarity between the plurality of transformed documents reflect the similarity of the plurality of original documents,
    determining a number of the plurality of symbols in the plurality of documents, the plurality of symbols in the plurality of documents are written by a same alphabet,
    preparing a set of sequence numbers randomly, a number of the set of sequence numbers is equal to the number of the plurality of symbols in the plurality of documents, adding an integer to all numbers of the set of sequence number, the integer is equal to or greater than 1, calculating a binary representation bit sequence of each number in the set of sequence number, deleting a leftmost bit from the each of the plurality of variable bit-length codewords, the leftmost bit is set to 1, obtaining a codewords set.

* * * * *